US007339163B2

(12) United States Patent
Marriott

(10) Patent No.: US 7,339,163 B2
(45) Date of Patent: Mar. 4, 2008

(54) MEANS FOR REMOVING UNWANTED ION FROM AN ION TRANSPORT SYSTEM AND MASS SPECTROMETER

(75) Inventor: Philip Marriott, Cheshire (GB)

(73) Assignee: Thermo Fisher Scientific (Bremen) GmbH (DE)

( * ) Notice: Subject to any disclaimer, the term of this patent is extended or adjusted under 35 U.S.C. 154(b) by 0 days.

(21) Appl. No.: 11/807,132

(22) Filed: May 25, 2007

(65) Prior Publication Data

US 2007/0228268 A1 Oct. 4, 2007

Related U.S. Application Data

(63) Continuation of application No. 11/299,250, filed on Dec. 9, 2005, now Pat. No. 7,230,232, which is a continuation of application No. 09/787,358, filed as application No. PCT/GB99/03076 on Sep. 16, 1999, now Pat. No. 7,202,470.

(30) Foreign Application Priority Data

Sep. 16, 1998 (GB) ................................ 9820210.4

(51) Int. Cl.
*H01J 49/00* (2006.01)
*B01D 59/44* (2006.01)

(52) U.S. Cl. ...................... 250/281; 250/282; 250/288; 250/423 R

(58) Field of Classification Search ..................... None
See application file for complete search history.

(56) References Cited

U.S. PATENT DOCUMENTS 6,259,091 B1 * 7/2001 Eiden et al. ................ 250/281

* cited by examiner

*Primary Examiner*—Nikita Wells
(74) *Attorney, Agent, or Firm*—Charles B. Katz

(57) ABSTRACT

The present invention relates to inductively coupled plasma mass spectrometry (ICPMS) in which a collision cell is employed to selectively remove unwanted artifact ions from an ion beam by causing them to interact with a reagent gas. The present invention provides a first evacuated chamber (6) at high vacuum located between an expansion chamber (3) and a second evacuated chamber (20) containing the collision cell (24). The first evacuated chamber (6) includes a first ion optical device (17). The collision cell (24) contains a second ion optical device (25). The provision of the first evacuated chamber (6) reduces the gas load on the collision cell (24), by minimising the residual pressure within the collision cell (24) that is attributable to the gas load from the plasma source (1). This serves to minimise the formation, or re-formation, of unwanted artifact ions in the collision cell (24).

29 Claims, 2 Drawing Sheets

MEANS FOR REMOVING UNWANTED ION FROM AN ION TRANSPORT SYSTEM AND MASS SPECTROMETER

CROSS-REFERENCE TO RELATED APPLICATIONS

This application is a continuation of and claims priority to U.S. application Ser. No. 11/299,250, filed on Dec. 9, 2005 now U.S. Pat. No. 7,230,232, which is a continuation of U.S. application Ser. No. 09/787,358 May 15, 2001 now U.S. Pat. No. 7,202,470, which is the national stage application under 35 U.S.C. §371 of International Application PCT/GB99/03076, filed on Sep. 16, 1999, the entire disclosures of which are incorporated by reference.

FIELD OF THE INVENTION

The present invention relates to inductively coupled plasma mass spectrometry (ICPMS). However, the concepts can be applied to any type of mass spectrometer which generates unwanted artefact ions as well as ions of analytical significance, such artefact ions having properties that allow them to be selectively removed from the ion beam by causing them to interact with a reagent gas whilst the ions of analytical significance are substantially retained in the beam.

BACKGROUND

The general principles of ICPMS are well known. It is a method of elemental analysis providing information about the elemental composition of a sample, with little or no information about its molecular structure. Typically, the sample is a liquid, which is nebulised and then passed through an electrically-maintained plasma, in which the temperature is high enough to cause atomization and ionisation of the sample. Typically temperatures greater than 5000K are used. The ions produced are introduced, via one or more stages of pressure reduction, into a mass analyser. The mass analyser is most commonly a quadrupole, although magnetic sector analysers are also used and, more recently, time-of-flight devices.

A problem common to all of these, although most troublesome in low-resolution devices such as quadrupoles, is the presence in the mass spectrum of unwanted artefact ions that impair the detection of some elements. The identity and proportion of artefact ions depends upon the chemical composition of both the plasma support gas and that of the original sample. There are many such artefact ions. Typical are argon-containing molecular ions that are encountered in argon-based ICPMS, which is the most wide-spread technique. Argon oxide ($ArO^+$) and argon dimer ($Ar_2^+$) are prominent, and interfere with the detection of iron ($^{56}Fe$) and selenium ($^{50}Se$) respectively. An example of a troublesome atomic ion is $Ar^+$, which interferes with the detection of $^{40}Ca$.

A collision cell may be used to remove unwanted artefact ions from an elemental mass spectrum. The use of a collision cell is described in EP 0 813 228 A1, WO 97/25737 and U.S. Pat. No. 5,049,739.

A collision cell is a substantially gas-tight enclosure through which ions are transmitted. It is positioned between the ion source and the main spectrometer. A target gas is admitted into the collision cell, with the objective of promoting collisions between ions and the neutral gas molecules or atoms. The collision cell may be a passive cell, as disclosed in U.S. Pat. No. 5,049,739, or the ions may be confined in the cell by means of ion optics, for example a multipole which is driven with a combination of alternating and direct voltages, as in EP 0 813 228. By this means the collision cell can be configured so as to transmit ions with minimal losses, even when the cell is operated at a pressure that is high enough to guarantee many collisions between the ions and the gas molecules.

By careful control of the conditions in the collision cell, it is possible to transmit the wanted ions efficiently. This is possible because in general the wanted ions, those that form part of the mass spectrum to be analyzed, are monatomic and carry a single positive charge; that is, they have "lost" an electron. If such an ion collides with a neutral gas atom or molecule, the ion will retain its positive charge unless the first ionisation potential of the gas is low enough for an electron to transfer to the ion and neutralise it. Consequently, gases with high ionisation potentials are ideal target gases.

Conversely, it is possible to remove unwanted artefact ions whilst continuing to transmit the wanted ions efficiently. For example the artefact ions may be molecular ions such as $ArO^+$ or $Ar_2^+$ which are much less stable than the atomic ions. In a collision with a neutral gas atom or molecule, a molecular ion may dissociate, forming a new ion of lower mass and one or more neutral fragments. In addition, the collision cross section for collisions involving a molecular ion tends to be greater than for an atomic ion. This was demonstrated by Douglas (Canadian Journal Spectroscopy, 1989 vol 34(2) pp 38-49). Another possibility is to utilise reactive collisions. Eiden et al (Journal of Analytical Atomic Spectrometry vol 11 pp 317-322 (1996)) used hydrogen to eliminate many molecular ions and also $Ar^+$, whilst analyte ions remain largely unaffected.

However, when the collision cell is operated at a pressure that is sufficiently high to promote removal of the artefact ions that originate in the plasma, other artefact ions may form. The chemical nature of these ions is not always known with certainty, but, for example, hydrocarbons that are present in the residual gas composition may be ionised by charge exchange. Various species of metal oxide and/or hydroxide ions such as $LaO^+$ and $LaOH^+$ have been observed, apparently formed in ion-molecule reactions in the cell. Water adduct ions such as $LaO.H_2O^+$ have also been observed. The artefact ions that are removed in the collision cell can also be generated there, for example by reactions such as:

$$O^+ + Ar \Rightarrow ArO^+$$

so that the extent to which such ions are removed from the beam will depend on the equilibrium of two or more reaction pathways.

Even when no collision gas is being admitted to the cell, the local pressure in the cell can be quite high, due to the gas load from the plasma itself. The gas load from the plasma is composed primarily of the plasma support gas, and so is generally neutral argon. The gas load from the plasma consists of a directed flow, which is carried with the ion beam, and a general back pressure in the evacuated chamber through which the ion beam passes. The gas load from the plasma will also contain other species, typically hydrogen and oxygen if the sample is dissolved in water, and probably organics, for example from rotary pump oil from the expansion chamber, which is the coarse vacuum stage commonly employed in ICPMS as the first stage of pressure reduction.

The present inventors have used a calculation similar to that described by Douglas and French (1988) to estimate the gas load on a collision cell in a typical prior art mass spectrometer. This calculation suggests that the local partial pressure in the cell due to the gas load from the plasma can be 0.001 mbar or even greater, especially if the collision cell is close to the ion source. Using a capillary connected to a capacitance manometer to measure the stagnation pressure in the sampled beam, the present inventors have found that with the probe on axis and 42 mm from the skimmer, a stagnation pressure of 0.2 mbar was measured, reducing to 0.002 mbar at a distance of 82 mm from the skimmer.

If the collision cell contains a significant partial pressure of argon, this will upset the operation of the instrument in two ways. Firstly, the ion beam will be attenuated by collisions between the ions in the beam and argon neutrals. Secondly, the presence of a large concentration of argon neutrals will favour the production of argon-containing molecular ions in reaction with ions in the beam. Similar considerations apply to other contaminants, in particular the organics, which have the potential to generate a rich spectrum of mass peaks.

It is an objective of this invention to provide a means whereby the formation, or re-formation, of unwanted artefact ions in a collision cell or other ion transport system may be minimised.

DISCLOSURE OF THE INVENTION

According to the present invention, a mass spectrometer comprises:

means for generating ions from a sample introduced into a plasma;

a sampling aperture for transmitting some of the ions into an evacuated expansion chamber along a first axis to form an ion beam;

a second aperture for transmitting some of the ion beam into a First evacuated chamber maintained at high vacuum;

a first ion optical device located in the first evacuated chamber for containing the ion beam;

a third aperture for transmitting the ion beam into a second evacuated chamber maintained at a lower pressure than the first evacuated chamber;

a collision cell having an entrance aperture and an exit aperture and pressurized with a target gas, the collision cell being disposed in the second evacuated chamber;

a second ion optical device located in the collision cell for containing the ion beam;

a fourth aperture for transmitting the ion beam into a third evacuated chamber containing mass-to-charge ratio analysing means disposed along a second axis for mass analysing the ion beam to produce a mass spectrum of the ion beam wherein the third evacuated chamber is maintained at lower pressure than the second evacuated chamber.

Preferably, the first evacuated chamber is maintained at a pressure of approximately $10^{-2}$ to $10^{-4}$ mbar, more preferably approximately 1-2×$10^{-3}$ mbar.

The provision of the first evacuated chamber at high vacuum between the expansion chamber and the second chamber containing the collision cell reduces the gas load on the collision cell, by minimising the residual pressure within the collision cell that is attributable to the gas load from the plasma source, and ensuring that the neutral gas composition within the collision cell is essentially that of the collision gas itself. The background gas load is reduced because the vacuum pump maintaining the first evacuated chamber at high vacuum removes the general background gas load, preventing it from entering the second chamber and the collision cell. The directed flow is reduced because the neutral gas flow is not confined by the first ion optical device and therefore diverges from the ion beam in the first evacuated chamber and therefore the directed flow of neutral gas entering the second evacuated chamber is considerably reduced. The ion optical device located in the first evacuated chamber enables sufficient transmission of ions through the first evacuated chamber.

The directed flow of neutrals entering the collision cell is further reduced by the provision of a gap between the third aperture and the entrance of the collision cell. The directed flow diverges from the ion beam as it passes through the third aperture and is skimmed off by the edges of the entrance aperture to the collision cell. Preferably this gap is at least 2 cm.

Preferably, the distance between the ion source and the collision cell is at least 90 mm. This is sufficient distance to allow the directed flow to diverge from the ion beam and thereby to reduce the gas load on the collision cell to a level that ensures that the neutral gas composition within the collision cell is essentially that of the collision gas alone. Given a particular gas load from the plasma, the pressure developed in the collision cell due to that gas load depends essentially upon simple geometric factors. Assuming a free jet expansion and ignoring shockwave effects, the gas load that enters the cell is proportional to the solid angle subtended at the ion source by the entrance aperture to the collision cell. The pressure developed in the collision cell is proportional to the gas load that enters the cell. The pressure is inversely proportional to the gas conductance out of the cell to regions that operate at a lower pressure; that is, to the total area of any apertures that communicate from the interior of the cell to any such region. The area of these apertures is constrained by practical considerations in that one must ensure that when the cell is pressurised (typically in the range 0.001 mbar to 0.1 mbar) with collision gas, the region outside the collision cell is maintained at an acceptably low pressure. By way of example, if the vacuum chamber containing the collision cell is pumped by means of a high vacuum pump of capacity 250 litres/second, the cell is to operate at a pressure of 0.02 mbar, a pressure of $10^{-4}$ mbar outside the collision cell is required, then the maximum acceptable conductance out of the collision cell is $250\times(1\times10^{-4})/0.02$ or 1.25 litres/second. This might correspond to an entrance aperture and an exit aperture both of diameter 2.3 mm if the collision gas is air.

It is desirable to minimise the local partial pressure within the collision cell due to the gas load from the plasma, or at least to ensure that the said pressure is acceptably low. Since the size of the cell apertures is essentially predetermined, the gas load from the plasma must be reduced by increasing the distance $D_{cell}$ from the ion source to the entrance aperture of the collision cell. The value deemed acceptable for the local pressure will depend on the length of the collision cell, but for a cell of length 130 mm a local partial pressure of less than 0.001 mbar is desirable. A calculation based on gas dynamics and largely following the treatment of Douglas and French (1988) suggests that $D_{cell}$ should be at least 200 mm for the partial pressure in the cell due to the gas load from the plasma to be less than 0.001 mbar. The present inventors have made measurements with a capacitance manometer which indicate that a smaller distance, about 90 mm, is adequate. If $D_{cell}$ is increased, the effect is to reduce the local pressure in the cell still further. However, this also has the effect of reducing the transmission efficiency of the ion optics and generally makes the design of the instrument more difficult. The present inventors have found that it is advantageous that $D_{cell}$ be less than 200 mm.

Preferably, the mass-to-charge ratio analysing means includes a main mass filter which preferably is an RF quadrupole, although a magnetic sector or a time-of-flight analyser may alternatively be employed.

The first ion optical device may be a static lens stack, an electrostatic ion guide, or an electrodynamic ion guide such as an RF multipole. Preferably, the ion optical device is a mass selective device. It is advantageous to employ a quadrupole, since this can be driven so as to transmit only ions of a specific mass to charge ratio (m/e) or a range of m/e. It thus functions as a auxiliary mass filter. A magnetic sector could be employed in a similar fashion. The auxiliary mass filter can be advantageously employed to first reduce the contribution of artefact ions to the mass spectrum, since it is set to transmit only ions from the same m/e as the main mass filter. Any artefact ion that is formed in the collision cell must therefore be a reaction product from an ion of the m/e that is selected in both the auxiliary mass filter and main mass filter. The artefact ion must have a different m/e from that selected, and so will not be transmitted by the main mass filter. Hence the mass spectrum is essentially free from artefact ions. For example, if the auxiliary mass filter is tuned so as to transmit essentially the ions of m/e 56, then the ions that enter the collision cell will be $^{56}Fe$ and $^{40}Ar^{16}O^+$ (an unwanted molecular ion that is formed in the plasma source). In the collision cell, $^{40}Ar^{16}O^+$ will be lost, while $^{56}Fe^+$ is transmitted efficiently. Although molecular or adduct ions may be formed, such as $^{56}Fe^{16}O^+$ at m/e 72 or $^{56}Fe.H_2O^+$ at m/e 74, these cannot cause mass spectral interference as the main mass filter is set instantaneously to pass only ions of m/e 56. The auxiliary mass filter and the main mass filter scan synchronously, so if the main mass filter is set to transmit m/e 72, no $^{56}Fe^{16}O$ can form in the collision cell because the auxiliary mass filter will have removed $^{56}Fe^+$ from the beans before it can enter the collision cell. Similar arguments apply to artefact ions formed by the fragmentation of molecular ions.

A further advantage of making the ion optical device a mass selective device, such as a quadrupole, is that the most abundant ions in the plasma beam are rejected by the mass selective device. The ion beam that leaves the device is much less intense, and exhibits little or no tendency to diverge under the influence of space-charge. It is therefore much easier to design the subsequent stages of ion optics to transport the beam efficiently.

The second ion optical device may be a static lens stack, an electrostatic ion guide, or a magnetic sector, but preferably it is an RF multipole. The second ion optical device may also be mass selective instead of, or as well as, the first ion optical device.

Preferably the second axis of the mass to charge ratio analysing means is offset from the first axis. This is effective in reducing the unresolved baseline noise signal that is generally present in ICPMS instruments.

Preferably, the first evacuated chamber is divided into a first region adjacent to the expansion chamber, and a second region adjacent to the collision cell, by a large diameter aperture. The ion optical device is located in the second region, and the first region may contain an extractor lens driven at a negative potential. Preferably the diameter of the aperture is approximately 20 mm, and it is preferably sealable. This may be achieved by means of a flat plate on an O-ring seal. This enables the second region to be isolated and maintained at a high pressure while the expansion chamber and the first region are vented to atmospheric pressure. This facilitates access to the components most prone to contamination, so that they can be readily replaced or refurbished.

BRIEF DESCRIPTION OF THE DRAWINGS

The invention is described with reference to the accompanying drawings in which.

DETAILED DESCRIPTION OF A PREFERRED EMBODIMENT

Figure 1:
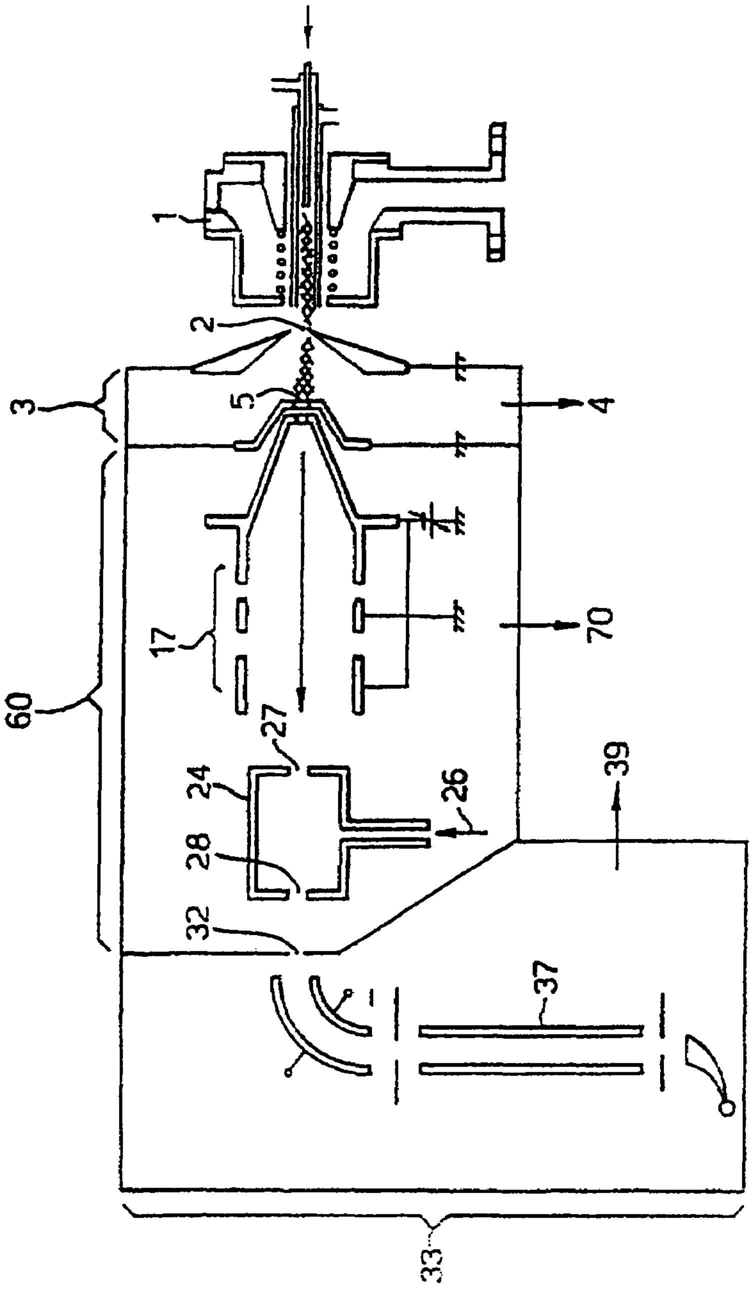
PRIOR ART Fig.1.
FIG. 1 shows a prior art mass spectrometer.

In the prior art mass spectrometer of FIG. 1, the inductively-coupled plasma (ICP) ion source 1 is of conventional design, operating at atmospheric pressure. Ions are generated in the plasma and entrained in the general gas flow, part of which passes through a sampling aperture 2. The expansion chamber 3, is located behind the sampling aperture 2 and is evacuated by means of a rotary-vane vacuum pump at 4. The gas flow that passes through the first aperture 2 expands as a super-sonic free jet, the central portion of which passes through the second aperture 5 into an evacuated chamber 60. Aperture 5 is in the form of a skimmer, for example such as described in U.S. Pat. No. 5,051,584. Located in the evacuated chamber 60 is an ion optical device 17, in this case a lens stack, and a collision cell 24 having an entrance aperture 27 and an exit aperture 28. The collision cell 24 is a simple passive collision cell, i.e. a chamber pressurised with target gas 26. On exiting the collision cell 24, the ion beam passes through aperture 32 into evacuated chamber 33 which contains a mass analyser 37.

Figure 2:
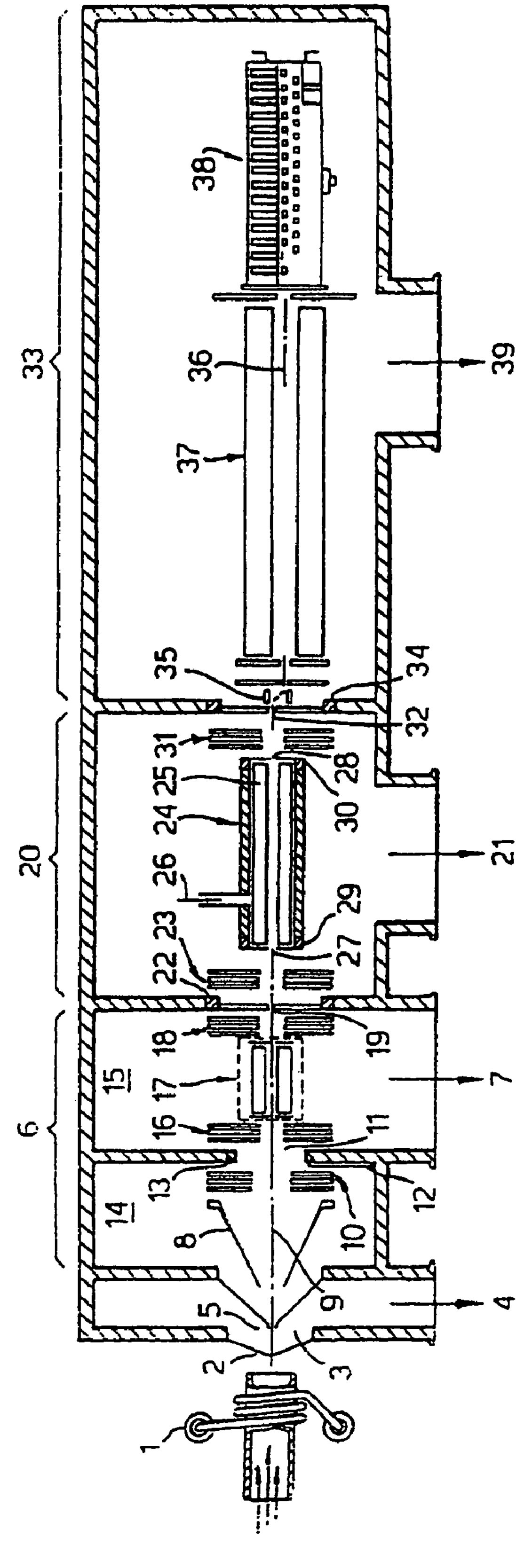
FIG. 2 shows a preferred embodiment of the present invention.

FIG. 2 shows an embodiment of the present invention in which parts corresponding to those shown in FIG. 1 are numbered accordingly. As in the prior art, the ICP ion source 1 generates ions which pass through a sampling aperture 2 into the expansion chamber 3 which is evacuated by means of a rotary-vane vacuum pump at 4. The gas flow that passes through the first aperture 2 expands as a super-sonic free jet, the central portion of which passes through the second aperture 5.

In the present invention the evacuated chamber 60 of the prior an is divided into two chambers, a first evacuated chamber 6 and a second evacuated chamber 20. The first evacuated chamber 6 is maintained at high vacuum by a high-vacuum pump, preferably a turbo-molecular pump, located at 7. The pressure in the first evacuated chamber may be of the order of $10^{-2}$ to $10^{-4}$ mbar, depending on the size of pump used, but is typically 1-2×$10^{-3}$ mbar.

The sample beam is believed to pass through the aperture 2 in a substantially neutral state. Under the influence of the extractor lens 8, which is driven at a negative potential, typically −200 to −1000 volts, electrons are diverted rapidly from the beam, and positive ions are accelerated away from the aperture 5 along the axis of the instrument. They are focussed by an ion lens 10 through an aperture 11, of relatively large diameter, typically about 20 mm. A flat plate 12 slides on an O-ring seal 13 and can be moved so as to completely obscure and seal the aperture 11. The aperture 11 divides the first evacuated chamber 6 into a first region 14 and a second region 15. Chamber 6 must be pumped efficiently, and so region 15 must offer a relatively unrestricted conductance. Preferably it will be at least as wide as the diameter of the high-vacuum pump 7.

When the plate 12 is retracted, aperture 11 provides a large pumping conductance, so that regions 14 and 15 are at essentially similar pressures, although the pressure in the region 14 closer to the skimmer may be marginally higher. The whole of the first evacuated chamber 6 is maintained at high vacuum by means of the high-vacuum pump at 7.

When the plate 12 is positioned so as to block the aperture 11, the region 15 is still maintained at high vacuum. However, region 14 is then pumped only via aperture 5, and so the pressure in region 15 becomes essentially that of the expansion chamber 3 between apertures 2 and 5, it is then possible to vent the expansion chamber 3 and region 14 to atmospheric pressure whilst maintaining high vacuum in region 15. This facilitates access to the components most prone to contamination, so that they can be readily replaced or refurbished.

The ions that have passed through aperture 11 are directed by an ion lens 16 into an ion optical device 17. Device 17 assists in containing the ion beam, which otherwise would tend to diverge rapidly under the influence of positive ion space-charge, and cause severe loss of sensitivity. The directed flow of neutral gas from the plasma, however, is not confined by the ion optical device 17 and diverges from the ion beam to be removed, along with the general back pressure of gas in the chamber 6, by the vacuum pump 7. Device 17 may be a quadrupole, a higher order multipole, an ion guide or an ion lens. As mentioned above, it is advantageous if the transmission-enhancing device can be made to be mass-selective. Preferably it will be a quadrupole, although in principle another mass selective device, such as a magnetic sector, could also be employed.

Ions transmitted by device 17 are focussed by the ion lens 18, and pass through an aperture 19 into the second evacuated chamber 20, maintained at a pressure lower than that of the first evacuated chamber 6 by a high-vacuum pump, preferably a turbo-molecular pump, located at 21. The pressure of this chamber is of the order $10^{-3}$ to $10^{-5}$ mbar, typically $1\text{-}2\times10^{-4}$ mbar. Aperture 19 has a relatively small diameter, typically 2-3 mm, thus establishing a pressure differential between the first evacuated chamber 6 and the second evacuated chamber 20. This prevents the background gas from chamber 6 from entering chamber 20, reducing the gas load on chamber 20, and so minimises any residual pressure in the chamber 20 due to the neutral gas load from the plasma. It is advantageous if aperture 19 is mounted on an insulator 22, so that it can be biased negative, causing ions to pass through it with relatively high translational energy. This helps to ensure efficient transport of the ions through the aperture 19 both by lowering the charge density within the beam and by minimising the beam divergence.

The ions are focussed by ion lens 23 into a collision cell 24, which is located in the second evacuated chamber 20. The collision cell 24 has an entrance aperture 27 and an exit aperture 28. As the ion beam emerges from the aperture 19, the neutral gas flow diverges and is skimmed off by the entrance aperture 27 of the collision cell 24, thus further reducing the gas load on the collision cell 24. Located in collision cell 24 is a multipole ion optical assembly 25. This may be a quadrupole, hexapole or octapole. The collision cell 25 is pressurised with a target gas 26, chosen for its capacity to remove, via a mechanism such as attachment or fragmentation, unwanted molecular ions from the ion beam whilst influencing other ions minimally. Typically the target gas may be helium or hydrogen, although many other gases may prove beneficial for specific analytical requirements.

Apertures 27 and 28 limit the gas conductance out of the collision cell, thus allowing it to operate at a relatively high pressure, typically in the range 0.001 mbar to 0.1 mbar, whilst minimising the gas load on chamber 20 and its associated high vacuum pump 21. The transport efficiency of ions through apertures 27 and 28 is improved by biassing the apertures negative. They are mounted on the collision cell by means of insulating gas-tight supports 29 and 30.

Ions that leave the collision cell 24 are accelerated and focussed by ion lens 31 through an aperture 32. This aperture establishes a pressure differential between chamber 20 and the third evacuated chamber 33 thus reducing the gas load on chamber 33, and further minimising any residual pressure therein due to the neutral gas load from the plasma. It is advantageous to mount aperture 32 on an insulating support 34. The aperture 32 can be then biassed negative with respect to ground, typically to −100 volts, so that ions pass through it with relatively high translational energy. This helps to ensure efficient transport of the ions through aperture 32 both by lowering the charge density within the beam and by minimising the beam divergence.

The ions pass through aperture 32 at relatively high translational energy, and pass through a double deflector 35 preferably at the same or higher energy. This deflects the ion beam away from the original instrument axis 9 and along the axis 36 of the quadrupole mass filter 37, which is used to mass analyse the ion beam. The double deflector 35 is advantageously in the form of two small cylindrical electrostatic sectors, cross-coupled and in series. We have found this configuration to be especially effective in reducing to below 1 CPS the unresolved baseline noise signal that is generally present in ICPMS instruments.

Ions of the selected m/e or range m/e are transmitted to a detector, which is typically an electron multiplier 38. The first dynode of the electron multiplier 38 is offset from axis 36 of the quadrupole mass filter, which further helps to minimise the unresolved baseline noise signal. Both the mass filter 37 and the detector 38 are housed in the third evacuated chamber 33, which is maintained at a pressure lower than that of the second evacuated chamber 20 by a high-vacuum pump 39. The pressure of this chamber is less than $10^{-4}$ mbar, typically about $10^{-6}$ mbar, although certain types of ion detectors can operate at pressures as high as $2\text{-}5\times10^{-5}$ mbar.

The invention claimed is:

1. A method of reducing the formation or re-formation of unwanted molecular ions in a collision or reaction cell of an elemental mass spectrometer, comprising the steps of:

(i) passing an ion beam through an ion optical device configured to transmit substantially only ions of a selected range of mass-to-charge ratios to form a first mass-selected ion beam;

(ii) passing at least a portion of the first mass-selected ion beam through the collision or reaction cell to a mass analyser; and (iii) operating the mass analyser only to transmit ions from the selected range of mass-to-charge ratios.

2. The method of claim 1, further comprising at step (ii) the additional step of colliding or reacting a proportion of the ions in the first mass-selected ion beam with a gas within the collision or reaction cell.

3. The method of claim 2, in which the gas comprises hydrogen or helium.

4. The method of claim 2, wherein the colliding or reacting step results in the formation of artefact ions, the artefact ions having mass-to-charge ratios outside the selected range of mass-to-charge ratios.

5. The method of claim 1, wherein a range of mass-to-charge ratios transmitted by the mass analyser is substantially the same as the selected range of mass-to-charge ratios transmitted by the ion optical device.

6. The method of claim 1, in which the selected range of mass-to-charge ratios is less than 16 amu wide.

7. The method of claim 1, in which the selected range of mass-to-charge ratios includes m/e 56 and does not include m/e 40 or m/e 72.

8. The method of claim 1, in which the ion optical device comprises an auxiliary mass filter.

9. The method of claim 8, in which the auxiliary mass filter comprises a quadrupole mass filter or a magnetic sector.

10. The method of claim 1, in which the selected range of mass-to-charge ratios is varied over time.

11. The method of claim 1, wherein the mass analyser is arranged to transmit a second selected range of mass-to-charge ratios, the second selected range having a width of substantially one amu.

12. The method of claim 1, in which the collision or reaction cell contains ion optics.

13. The method of claim 12, in which the ion optics comprise one of a quadrupole, a hexapole or an octopole.

14. The method of claim 12, in which the ion optics are mass selective.

15. A method of reducing space charge effects in a collision or reaction cell of an elemental mass spectrometer, comprising the steps of:

(i) passing an ion beam through an ion optical device configured to transmit substantially only ions of a selected range of mass-to-charge ratios to form a first mass-selected ion beam;

(ii) passing at least a portion of the first mass-selected ion beam through the collision or reaction cell to a mass analyser; and (iii) operating the mass analyser only to transmit ions from the selected range of mass-to-charge ratios.

16. An elemental mass spectrometer comprising:

a mass-selective ion optical device for receiving an ion beam, the ion optical device configured only to transmit at least a portion of the ion beam having a first selected range of mass-to-charge ratios to form a first transmitted ion beam;

a collision or reaction cell arranged to receive at least a portion of the first transmitted ion beam, and being configured such that at least a portion of the received first transmitted ion beam is transmitted therethrough as a second transmitted ion beam; and a mass analyser arranged to receive at least a portion of the second transmitted ion beam and being configured only to transmit at least a portion of the received second transmitted ion beam having mass-to-charge ratios from the selected range of mass-to-charge ratios.

17. The elemental mass spectrometer of claim 16, in which the collision or reaction cell is pressurised with a gas.

18. The elemental mass spectrometer of claim 17, in which the gas comprises hydrogen or helium.

19. The elemental mass spectrometer of claim 17, in which the mass-selective ion optical device is configured to transmit a first selected range of mass-to-charge ratios which excludes mass-to-charge ratios of artefact ions which may be formed due to the collision or reaction of ions of the received first transmitted ion beam with gas in the collision or reaction cell.

20. The elemental mass spectrometer of claim 16, wherein the mass analyser is configured to transmit a second selected range of mass-to-charge ratios, the second selected range being substantially the same as the first selected range.

21. The elemental mass spectrometer of claim 16, in which the mass-selective ion optical device is configured to transmit a first selected range of mass-to-charge ratios which is less than 16 amu wide.

22. The elemental mass spectrometer of claim 16, in which the mass-selective ion optical device is configured to transmit a first selected range of mass-to-charge ratios which excludes m/e 40 and m/e 72 but includes m/e 56.

23. The elemental mass spectrometer of claim 16, in which the mass-selective ion optical device comprises an auxiliary mass filter.

24. The elemental mass spectrometer of claim 23, in which the auxiliary mass filter comprises a quadrupole or a magnetic sector.

25. The elemental mass spectrometer of claim 16, in which the ion optical device is configured to vary the first selected range of mass-to-charge ratios over time.

26. The elemental mass spectrometer of claim 16, in which the mass analyser is arranged to transmit a second selected range of mass-to-charge ratios, the second selected range having a width of substantially one amu.

27. The elemental mass spectrometer of claim 16, in which the collision or reaction cell contains ion optics.

28. The elemental mass spectrometer of claim 27, in which the ion optics contained in the collision or reaction cell comprise a quadrupole, a hexapole or an octopole.

29. The elemental mass spectrometer of claim 27, in which the ion optics contained in the collision or reaction cell are arranged to be mass selective.

* * * * *